United States Patent
Shatunov et al.

(10) Patent No.: US 11,056,719 B2
(45) Date of Patent: * Jul. 6, 2021

(54) LITHIUM SECONDARY BATTERY COMPRISING ELECTROLYTE

(71) Applicant: Samsung SDI Co., Ltd., Yongin-si (KR)

(72) Inventors: Pavel Shatunov, Yongin-si (KR); Olga Tsay, Yongin-si (KR); Aeran Kim, Yongin-si (KR); Hyunbong Choi, Yongin-si (KR); Jin-Hyeok Lim, Yongin-si (KR); Jungmin Han, Yongin-si (KR); Myunghwan Jeong, Yongin-si (KR); Soojin Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/655,130

(22) Filed: Oct. 16, 2019

(65) Prior Publication Data

US 2020/0052336 A1 Feb. 13, 2020

Related U.S. Application Data

(63) Continuation-in-part of application No. 16/335,240, filed as application No. PCT/KR2017/009934 on Sep. 11, 2017, now Pat. No. 10,916,806.

(30) Foreign Application Priority Data

Sep. 30, 2016 (KR) .................. 10-2016-0126806

(51) Int. Cl.
*H01M 6/04* (2006.01)
*H01M 10/0567* (2010.01)
(Continued)

(52) U.S. Cl.
CPC ......... *H01M 10/0567* (2013.01); *C07F 9/062* (2013.01); *H01M 10/0525* (2013.01);
(Continued)

(58) Field of Classification Search
CPC ......... H01M 10/0567; H01M 10/0525; H01M 10/0568; H01M 2/0207; H01M 2/028;
(Continued)

(56) References Cited

U.S. PATENT DOCUMENTS 3,242,171 A 3/1966 Schmutzler
2008/0118843 A1 5/2008 Tarnopolsky
(Continued)

FOREIGN PATENT DOCUMENTS

EP 1926172 A1 5/2008
EP 2615680 A1 7/2013
(Continued)

OTHER PUBLICATIONS

U.S. Office Action dated May 14, 2020, issued in U.S. Appl. No. 16/335,240 (8 pages).
(Continued)

*Primary Examiner* — Jane J Rhee
(74) *Attorney, Agent, or Firm* — Lewis Roca Rothgerber Christie LLP

(57) ABSTRACT

The present invention relates to a lithium secondary battery including an electrolyte including a non-aqueous organic solvent, a lithium salt and an additive comprising a compound represented by Chemical Formula 1; and a battery case in which the electrolyte is housed, wherein the battery case has a shape with a width (W), a height (H), and a thickness (Th), when a maximum value among the width (W), the height (H), and the thickness (Th) is a and a minimum value among the width (W), the height (H), and the thickness (Th) is b, b/a is 0.01 or more:

(Continued)

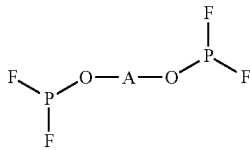

[Chemical Formula 1]

wherein, in Chemical Formula 1, A is a substituted or unsubstituted aliphatic chain or ($—C_2H_4—O—C_2H_4-$)n, and n is an integer from 1 to 10.

14 Claims, 9 Drawing Sheets

(51) Int. Cl.
    *H01M 10/0525* (2010.01)
    *H01M 10/0568* (2010.01)
    *C07F 9/06* (2006.01)
    *H01M 50/10* (2021.01)
    *H01M 50/116* (2021.01)
    *H01M 50/124* (2021.01)

(52) U.S. Cl.
    CPC ....... *H01M 10/0568* (2013.01); *H01M 50/10* (2021.01); *H01M 50/116* (2021.01); *H01M 50/124* (2021.01); *H01M 2300/0025* (2013.01)

(58) Field of Classification Search
    CPC ............. H01M 2/0285; H01M 2/0284; H01M 2300/0025
    See application file for complete search history.

(56) References Cited

U.S. PATENT DOCUMENTS

| | | |
|---|---|---|
| 2009/0291370 A1 | 11/2009 | Kim et al. |
| 2013/0177818 A1 | 7/2013 | Han et al. |
| 2014/0272604 A1 | 9/2014 | Lim et al. |
| 2016/0056503 A1 | 2/2016 | Shatunov et al. |
| 2017/0331143 A1 | 11/2017 | Morinaka et al. |
| 2019/0252724 A1 | 8/2019 | Shatunov et al. |
| 2020/0052333 A1 | 2/2020 | Shatunov et al. |
| 2020/0052334 A1 | 2/2020 | Shatunov et al. |
| 2020/0052335 A1 | 2/2020 | Shatunov et al. |
| 2020/0052337 A1 | 2/2020 | Shatunov et al. |

FOREIGN PATENT DOCUMENTS

| | | |
|---|---|---|
| KR | 10-2009-0120961 A | 11/2009 |
| KR | 10-2014-0104383 A | 8/2014 |
| KR | 10-2015-0022653 A | 3/2015 |
| KR | 10-2015-0078690 A | 7/2015 |
| KR | 10-2016-0024414 A | 3/2016 |
| WO | WO 2016/088773 A1 | 6/2016 |

OTHER PUBLICATIONS

EPO Extended Search Report dated Jun. 30, 2020, for corresponding European Patent Application No. 17856605.5 (8 pages).
U.S. Office Action dated Sep. 1, 2020, issued in U.S. Appl. No. 16/655,118 (7 pages).
Bell, Graeme A. et al., "Instant Ligands. Part 1, Preparation of Some Bidentate Fluorophosphine Ligands Derived from Straight Chain Organic Substrates, and their Reactions to form Molybdenum Complexes", J. Chem. Soc. Dalton. Trans., 1986, vol. 8, pp. 1689-1692.
Reddy, G. S. et al., "Nuclear Magnetic Resonance Studies on Fluorides of Trivalent Phosphorus", Z. Naturforschg., 1965, vol. 20b, pp. 104-109.
Office Action issued in U.S. Appl. No. 16/655,123 by the USPTO, dated Aug. 6, 2020, 8 pages.
U.S. Notice of Allowance dated Sep. 30, 2020, issued in U.S. Appl. No. 16/335,240 (5 pages).
U.S. Office Action dated Oct. 7, 2020, issued in U.S. Appl. No. 16/655,126 (7 pages).
U.S. Office Action dated Nov. 12, 2020, issued in U.S. Appl. No. 16/655,136 (7 pages).
U.S. Notice of Allowance dated Feb. 17, 2021, issued in U.S. Appl. No. 16/655,118 (5 pages).
U.S. Notice of Allowance dated Feb. 24, 2021, issued in U.S. Appl. No. 16/655,126 (5 pages).
U.S. Notice of Allowance dated Dec. 16, 2020, issued in U.S. Appl. No. 16/655,123 (5 pages).
U.S. Notice of Allowance dated Mar. 31, 2021, issued in U.S. Appl. No. 16/655,136 (5 pages).

Thickness (Th)

LITHIUM SECONDARY BATTERY COMPRISING ELECTROLYTE

CROSS-REFERENCE TO RELATED APPLICATION(S)

This application is a continuation-in-part of U.S. patent application Ser. No. 16/335,240, filed on Mar. 20, 2019, which is a National Phase Patent Application of International Patent Application Number PCT/KR2017/009934, filed on Sep. 11, 2017, which claims priority of Korean Patent Application No. 10-2016-0126806, filed on Sep. 30, 2016. The entire contents of all of which are incorporated herein by reference.

TECHNICAL FIELD

This disclosure relates to a lithium secondary battery.

BACKGROUND ART

A portable information device such as a cell phone, a laptop, smart phone, and the like or an electric vehicle has used a lithium secondary battery having high energy density and easy portability as a driving power source.

In general, a lithium secondary battery is manufactured by using materials capable of reversibly intercalating and deintercalating lithium ions as a positive active material and a negative active material and filling an electrolyte between the positive electrode and the negative electrode.

Lithium-transition metal oxides are used as the positive active material of the lithium secondary battery, various types of carbon-based materials are used as the negative active material, and lithium salts dissolved in the non-aqueous organic solvent are used as an electrolyte.

In particular, as a lithium secondary battery exhibits battery characteristics by complex reactions such as those between a positive electrode and an electrolyte, a negative electrode and an electrolyte, and the like, the use of a suitable electrolyte is one of important parameters for improving the performance of a lithium secondary battery.

DETAILED DESCRIPTION OF THE INVENTION

Technical Problem

Embodiments provide a lithium secondary battery exhibiting fewer battery changes (e.g., less deterioration in performance) by reducing the amount of a generated gas during charging and discharging.

Technical Solution

In one aspect, the present disclosure provides a lithium secondary battery including: a non-aqueous organic solvent, a lithium salt, and an additive including a compound represented by Chemical Formula 1; and a battery case in which the electrolyte is housed, wherein the battery case has a shape with a width (W), a height (H), and a thickness (Th), and when a maximum value among the values of the width (W), the height (H), and the thickness (Th) is referred to as a, and a minimum value among the values of the width (W), the height (H), and the thickness (Th) is referred to as b, b/a is 0.01 or more.

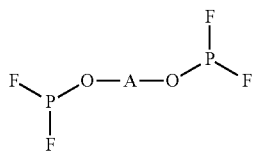

[Chemical Formula 1]

In Chemical Formula 1, A is a substituted or unsubstituted aliphatic chain or $(-C_2H_4-O-C_2H_4-)n$, and n is an integer from 1 to 10.

Advantageous Effects

According to the embodiments, the amount of gas generated during charging and discharging of a lithium secondary battery may be reduced, the lithium secondary battery may thereby have low thickness changes.

MODE FOR INVENTION

Figure 1:
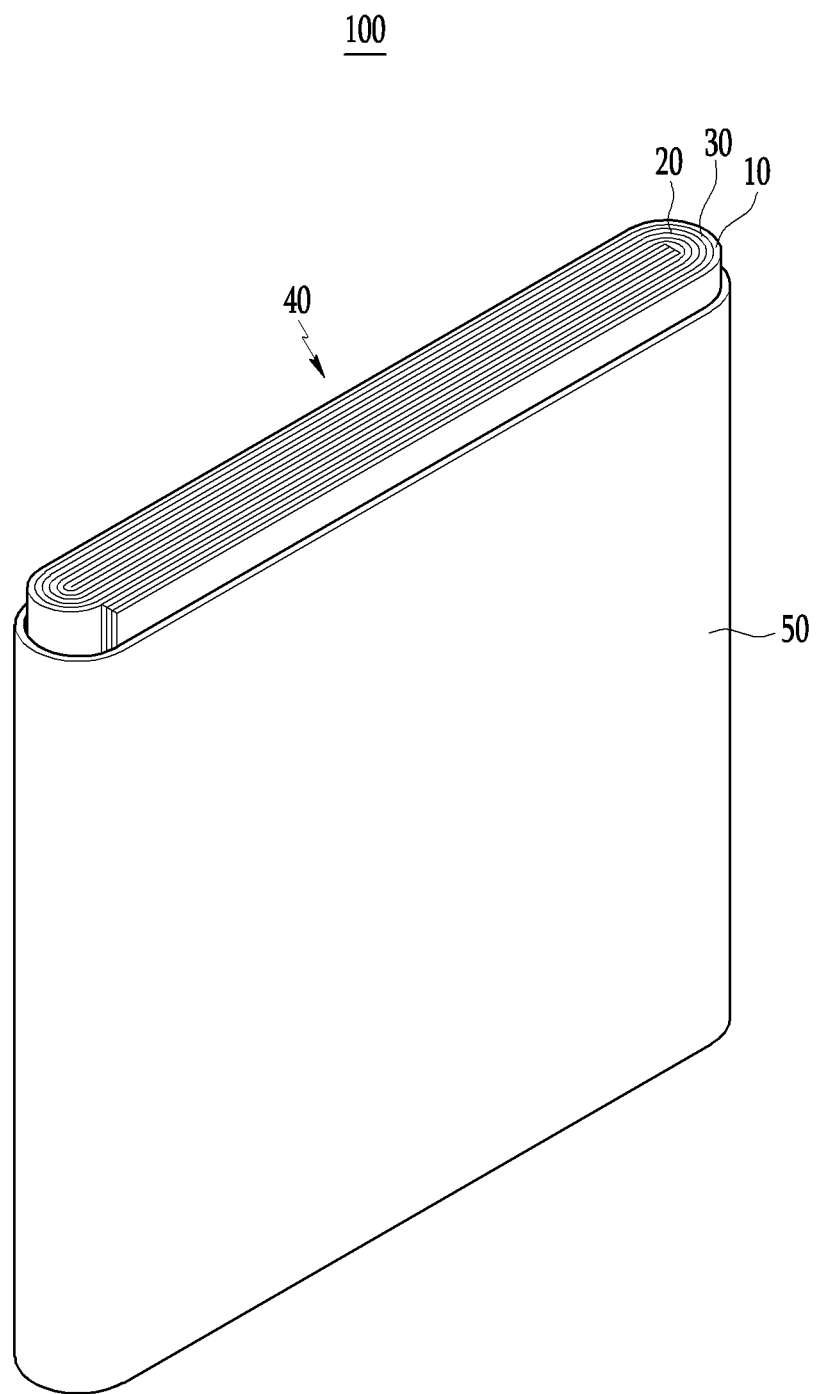
FIG. 1 is a perspective view of a lithium secondary battery according to an embodiment of the present disclosure.

Hereinafter, the present disclosure will be described more fully hereinafter with reference to the accompanying drawings, in which exemplary embodiments of the invention are shown. However, this disclosure may be embodied in many different forms and is not construed as limited to the example embodiments set forth herein.

In order to clearly illustrate the present invention, parts that are not related to the description are omitted, and the same or similar components are denoted by the same reference numerals throughout the specification.

Sizes and thicknesses of components in the drawings are arbitrarily expressed for convenience of description and, thus, the present invention is not limited by the drawings.

In addition, unless explicitly described to the contrary, the word "comprise" and variations such as "comprises" or "comprising," will be understood to imply the inclusion of stated elements but not the exclusion of any other elements.

An electrolyte of a lithium secondary battery may be generally an organic solvent in which a lithium salt is dissolved. In particular, non-aqueous organic solvents having a high ionic conductivity and dielectric constant and a low viscosity may be used.

In lithium secondary battery using a carbonate-based solvent of such a non-aqueous organic solvent, an irreversible side reaction may occur between the electrolyte and the positive electrode, and between the electrolyte and the negative electrode at a high temperature and a high pressure.

The decomposition products produced by such a side reaction form a thick passivation film which acts as a resistance on the surface of the electrode and decrease a cycle life and capacity of the lithium secondary battery. Also, due to the decomposition of a carbonate-based organic solvent, gas is generated inside the battery which causes a swelling phenomenon and it may lead to battery explosion.

Accordingly, the inventors of the present invention have conducted studies to develop an electrolyte composition for a lithium secondary battery that prevents or reduces the swelling phenomenon of a lithium secondary battery and has excellent stability and cycle-life characteristics, and as a result, it has been found that the above object may be achieved by using a compound represented by Chemical Formula 1.

That is, the electrolyte for a lithium secondary battery according to the present disclosure comprises a non-aqueous organic solvent, a lithium salt, and an additive including a compound represented by Chemical Formula 1.

[Chemical Formula 1]

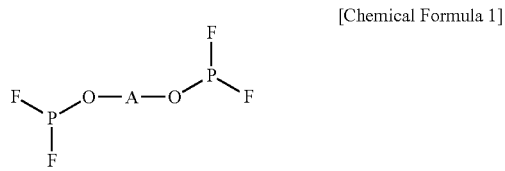

In Chemical Formula 1, A is a substituted or unsubstituted aliphatic chain or (—$C_2H_4$—O—$C_2H_4$-)n, and n is an integer from 1 to 10.

In Chemical Formula 1, A may be a C2 to C20 hydrocarbon chain or (—$C_2H_4$—O—$C_2H_4$-)n, and n may be an integer ranging from 1 to 5.

In addition, the compound represented by Chemical Formula 1 may be a compound represented by Chemical Formula 1-1.

[Chemical Formula 1-1]

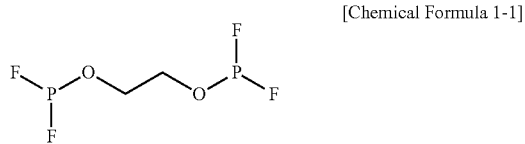

When the electrolyte including an additive including the compound represented by Chemical Formula 1 is applied to a lithium secondary battery, the cycle-life characteristics of the lithium secondary battery may be improved and the generation of gas at a high temperature may be greatly reduced.

The compound represented by Chemical Formula 1 includes a difluorophosphite (—$OPF_2$) group having excellent electrochemical reactivity at both terminals.

During the initial charge of a lithium secondary battery, lithium ions, which are released from the lithium-transition metal oxide, i.e., the positive electrode, are transported into a carbon electrode which is a negative electrode and intercalated thereinto. Because of its high reactivity, lithium reacts with the carbon electrode to produce $Li_2CO_3$, LiO, LiOH, etc., thereby forming a thin film on the surface of the negative electrode. This thin film is referred to as a solid electrolyte interface (SEI) film. The SEI thin film formed during the initial charge prevents the reaction between lithium ions and carbon negative electrode or other materials during charge and discharge. In addition, it also acts as an ion tunnel, allowing the passage of only lithium ions. The ion tunnel prevents disintegration of the structure of the carbon negative electrode, which is caused by co-intercalation of organic solvents of the electrolyte, having a high molecular weight along with solvated lithium ions into the carbon negative electrode. Once the SEI thin film is formed, lithium ions do not react again with the carbon negative electrode or other materials, such that the amount of lithium ions is reversibly maintained. Therefore, in order to improve the high-temperature cycle characteristics and the low-temperature output of the lithium secondary battery, a rigid SEI thin film must be always formed on the negative electrode of the lithium secondary battery.

However, when the additive including the compound represented by Chemical Formula 1 is included like (e.g., as in) the electrolyte for a lithium secondary battery according to the present disclosure, a rigid SEI film having good ion conductivity is formed on the surface of the negative electrode, and thereby it is possible to suppress a decomposition of the surface of the negative electrode during high temperature cycle operation and to prevent an oxidation reaction of the electrolyte solution.

When the compound represented by Chemical Formula 1 is decomposed, a difluorophosphite (—$OPF_2$) group and an ethylene dioxide fragment may be formed.

The difluorophosphite (—$OPF_2$) group may form a donor-acceptor bond with transition metal oxide that is exposed on the surface of the positive active material due to excellent electrochemical reactivity and thus a protective layer in a form of a composite may be formed.

In addition, the difluorophosphite (—$OPF_2$) adhered to the transition metal oxide at the initial charge of the lithium secondary battery may be oxidized to a plurality of fluorophosphates, and thus more stable inactive layer having excellent ion conductivity may be formed on a positive electrode. Therefore, it is possible to prevent other components of the electrolyte from being oxidation-decomposed, and as a result, the cycle-life performance of the lithium secondary battery may be improved and a swelling phenomenon may be prevented from occurring.

Further, the compound represented by Chemical Formula 1 and its oxide participate in the electrochemical reaction with the components of the SEI thin film to make the SEI thin film more rigid and to improve stability of other components included in the electrolyte by oxidative decomposition.

In addition, the compound represented by Chemical Formula 1 forms a composite with $LiPF_6$ and thus undesirable side reactions may be prevented from occurring, and it is possible to improve cycle-life characteristics of the lithium secondary battery and to prevent the generation of gas in the lithium secondary battery, thereby significantly reducing an occurrence rate of defects due to a swelling phenomenon.

On the other hand, the additive including the compound represented by Chemical Formula 1 may be included in an amount of 0.1 wt % to 10 wt % based on a total amount of the electrolyte for a lithium secondary battery. More specifically, the amount of the compound represented by Chemical Formula 1 may be 0.1 wt % to 5 wt % or 0.1 wt % to 1 wt %. When the amount of the additive satisfies the above ranges, a resistance increase may be prevented and thus a lithium secondary battery having improved cycle-life characteristics may be realized.

The electrolyte for a lithium secondary battery of this disclosure may further include an additional additive. The additional additive may be, for example, at least one selected from the group consisting of fluoroethylene carbonate, vinylethylene carbonate, vinylene carbonate, succinonitrile, hexane tricyanide, lithium tetrafluoroborate, propane sultone, and a combination thereof, but is not limited thereto.

Herein, an amount of the additional additive may be 0.1 wt % to 20 wt % based on a total amount of the electrolyte for a lithium secondary battery. More specifically, the amount of the additional additive may be 0.1 wt % to 15 wt %. When the amount of the additional additive satisfies the above ranges, battery resistance may be effectively suppressed and a lithium secondary battery having cycle-life characteristics may be realized.

On the other hand, the non-aqueous organic solvent serves as a medium for transporting ions taking part in the electrochemical reaction of a lithium secondary battery.

The non-aqueous organic solvent may include a carbonate-based, ester-based, ether-based, ketone-based, alcohol-based, or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or the like. The ester-based solvent may include methyl acetate, ethyl acetate, n-propyl acetate, dimethylacetate, methylpropionate, ethyl propionate, propyl propionate, γ-butyrolactone, decanolide, valerolactone, mevalonolactone, caprolactone, and/or the like.

The ether-based solvent may include dibutyl ether, tetraglyme, diglyme, dimethoxyethane, 2-methyltetrahydrofuran, tetrahydrofuran, and/or the like, and the ketone-based solvent may include cyclohexanone, and/or the like.

The alcohol-based solvent may include ethanol, isopropyl alcohol, and/or the like, and the aprotic solvent may include nitriles such as T-CN (wherein T is a hydrocarbon group having a C2 to C20 linear, branched, or cyclic structure and may include a double bond, an aromatic ring, or an ether bond), and/or the like, dioxolanes such as 1,3-dioxolane, and/or the like, sulfolanes, and/or the like.

The non-aqueous organic solvent may be used alone or in a mixture. When the organic solvent is used in a mixture, the mixture ratio may be controlled in accordance with a desirable battery performance.

The carbonate-based solvent is prepared by mixing a cyclic carbonate and a linear carbonate. When the cyclic carbonate and linear carbonate are mixed together in a volume ratio of 1:1 to 1:9, an electrolyte performance may be improved.

The non-aqueous organic solvent may further include an aromatic hydrocarbon-based organic solvent in addition to the carbonate-based solvent. Herein, the carbonate-based solvent and the aromatic hydrocarbon-based organic solvent may be mixed in a volume ratio of 1:1 to 30:1.

The aromatic hydrocarbon-based organic solvent may be an aromatic hydrocarbon-based compound of Chemical Formula 2.

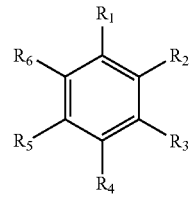

[Chemical Formula 2]

In Chemical Formula 2, $R_1$ to $R_6$ are the same or different and are each independently selected from the group consisting of hydrogen, halogen, C1 to C10 alkyl group, haloalkyl group, and a combination thereof.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte of a lithium secondary battery may further include an ethylene carbonate-based compound represented by Chemical Formula 3 in order to improve cycle life of a battery.

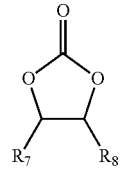

[Chemical Formula 3]

In Chemical Formula 3, $R_7$ and $R_8$ are each independently selected from hydrogen, a halogen, a cyano group (CN), a nitro group ($NO_2$), and a fluorinated C1 to C5 alkyl group, provided that at least one of $R_7$ and $R_8$ is selected from a halogen, a cyano group (CN), a nitro group ($NO_2$), and a fluorinated C1 to C5 alkyl group, and $R_7$ and $R_8$ are not simultaneously hydrogen.

Examples of the ethylene carbonate-based compound may be difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the additive for improving cycle life may be used within an appropriate range.

The lithium salt dissolved in the non-aqueous solvent supplies lithium ions in a battery, enables a basic operation of a lithium secondary battery, and improves transportation of the lithium ions between positive and negative electrodes. Examples of the lithium salt include at least one supporting salt selected from $LiPF_6$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, LiAlO$_2$, LiAlCl$_4$, LiN(C$_x$F$_{2x+1}$SO$_2$)(C$_y$F$_{2y+1}$SO$_2$) (wherein x and y are natural numbers, for example, an integer ranging from 0 to 20), LiCl, LiI, LiB(C$_2$O$_4$)$_2$ (lithium bis(oxalato) borate, LiBOB), LiDFOP (lithium difluoro bis(oxalato) phosphate), LiDFOB (lithium difluoro(oxalato) borate), and LiPO$_2$F$_2$ (lithium difluorophosphate). The lithium salt may be used in a concentration from 0.1 M to 2.0 M. When the lithium salt is included at the above concentration range, an electrolyte may have excellent performance and lithium ion mobility due to optimal electrolyte conductivity and viscosity.

A lithium secondary battery according to one embodiment relates to a lithium secondary battery including a battery case in which the electrolyte is housed. The battery case has a shape with a width (W), a height (H), and a thickness (Th), and when a maximum value among the values of the width (W), the height (H), and the thickness (Th) is referred to as a, and a minimum value among the values of the width (W), the height (H), and the thickness (Th) is referred to as b, b/a is 0.01 or more.

The value of b/a may be controlled depending on battery types (e.g., kind), and for example, if the battery is a pouch-type battery (e.g., a pouch battery), b/a may be 0.01 to 0.4, or 0.1 to 0.35. If the battery is a prismatic battery, b/a may be more than 0.1, and in one embodiment, b/a may be more than 0.1 and less than or equal to 0.6.

If the battery is a pouch-type battery (e.g., a pouch battery), when the battery includes the electrolyte with the compound represented by Chemical Formula 1 as the additive, and when b/a is within the above ranges (e.g., for a pouch battery), the thickness increase rate during charging and discharging may be significantly (e.g., abruptly) reduced. If b/a is out of the above ranges, it is not desirable because the thickness increase rate may be increased (e.g., may be too high).

If the battery is a prismatic battery, when the battery includes the electrolyte with the compound represented by Chemical Formula 1 as the additive, and when b/a is within the above ranges (e.g., for a prismatic battery), the thickness increase rate during charging and discharging may be significantly (e.g., abruptly) reduced. If b/a is out of the above ranges, it is not desirable because the thickness increase rate may be increased (e.g., may be too high).

As described above, when b/a is suitably controlled or arranged depending on (e.g., according to) the battery type, the thickness increase rate during charging and discharging of the battery may be suppressed. Furthermore, in one or more embodiments, even if b/a is controlled (e.g., to be within the above ranges), when the electrolyte without the compound represented by Chemical Formula 1 is used, no effects from the b/a (e.g., on the thickness increase rate) will be obtained. That is, when b/a is suitably controlled in the lithium secondary battery according to one embodiment and the electrolyte with the additive including the compound of Chemical Formula 1 is included, the amount of the generated gas is reduced, thereby inhibiting the thickness increase rate. If one of the electrolyte and b/a of the battery case does not satisfied the above respective conditions, it is not desirable because the desired effects may not be obtained.

Figure 6:
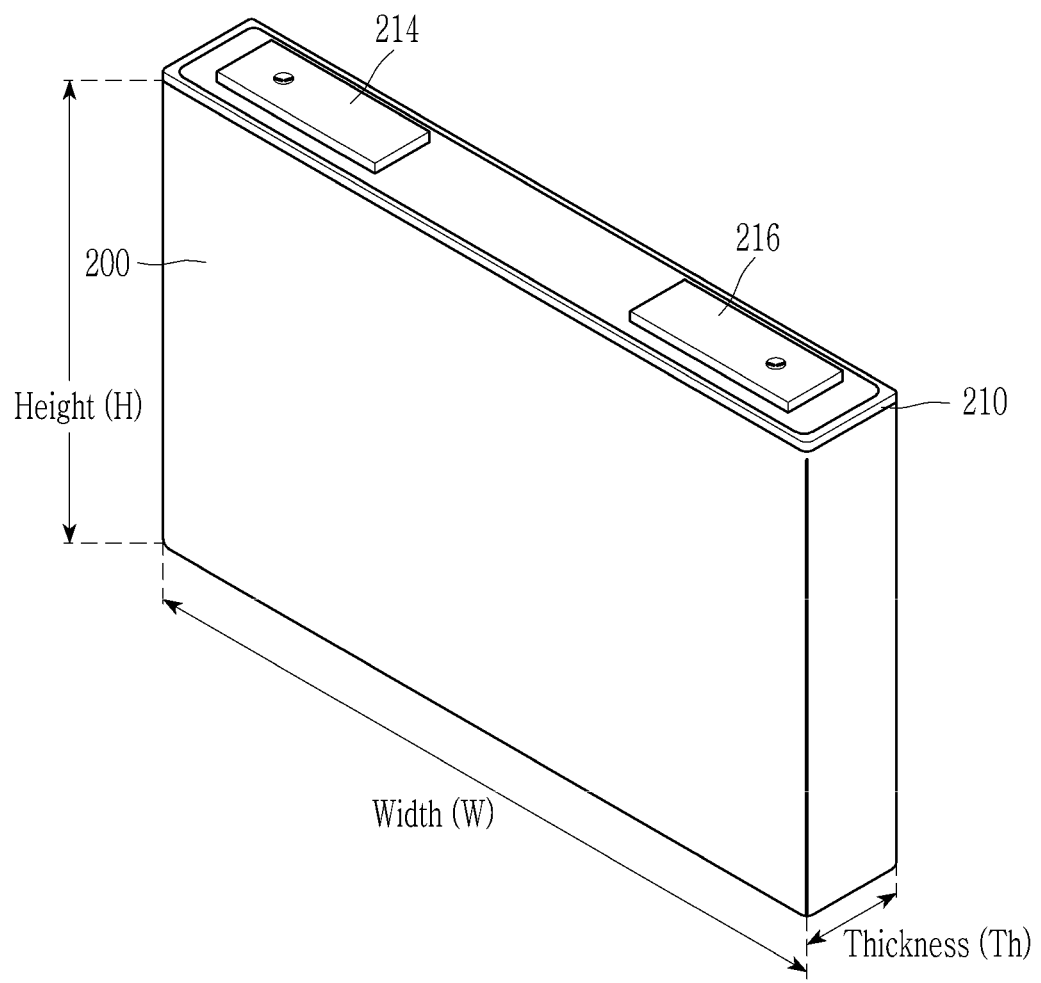
FIG. 6 is a drawing of a prismatic lithium secondary battery according to one embodiment.

In the specification, in the prismatic battery, the width (W), the height (H), and the thickness (Th) refer respectively to the width (W), the height (H), and the thickness (Th) shown in FIG. 6 (in which the prismatic battery is schematically shown). That is, the height refers to the height of only the battery case excepting (e.g., excluding) a cap plate. As shown in FIG. 6, the prismatic battery includes a battery case (200), a cap plate (210), a first electrode tab (214), and a secondary electrode tab (216). In this case, when the maximum value among the values of the width (W), the height (H), and the thickness (Th) is referred to as a and the minimum value thereof is referred to as b, b/a is controlled to be 0.01 to 0.4. For example, when the thickness (Th) is 0.3 mm, the height (H) is 30 mm, and the width (W) is 30 mm, a is 30 mm and b is 0.3 mm so that b/a is 0.01. a and b are selected depending on the values of the width (W), the height (H), and the thickness (Th), so that it is not limited that a should be the value of height and b should be the value of thickness.

Figure 7A:
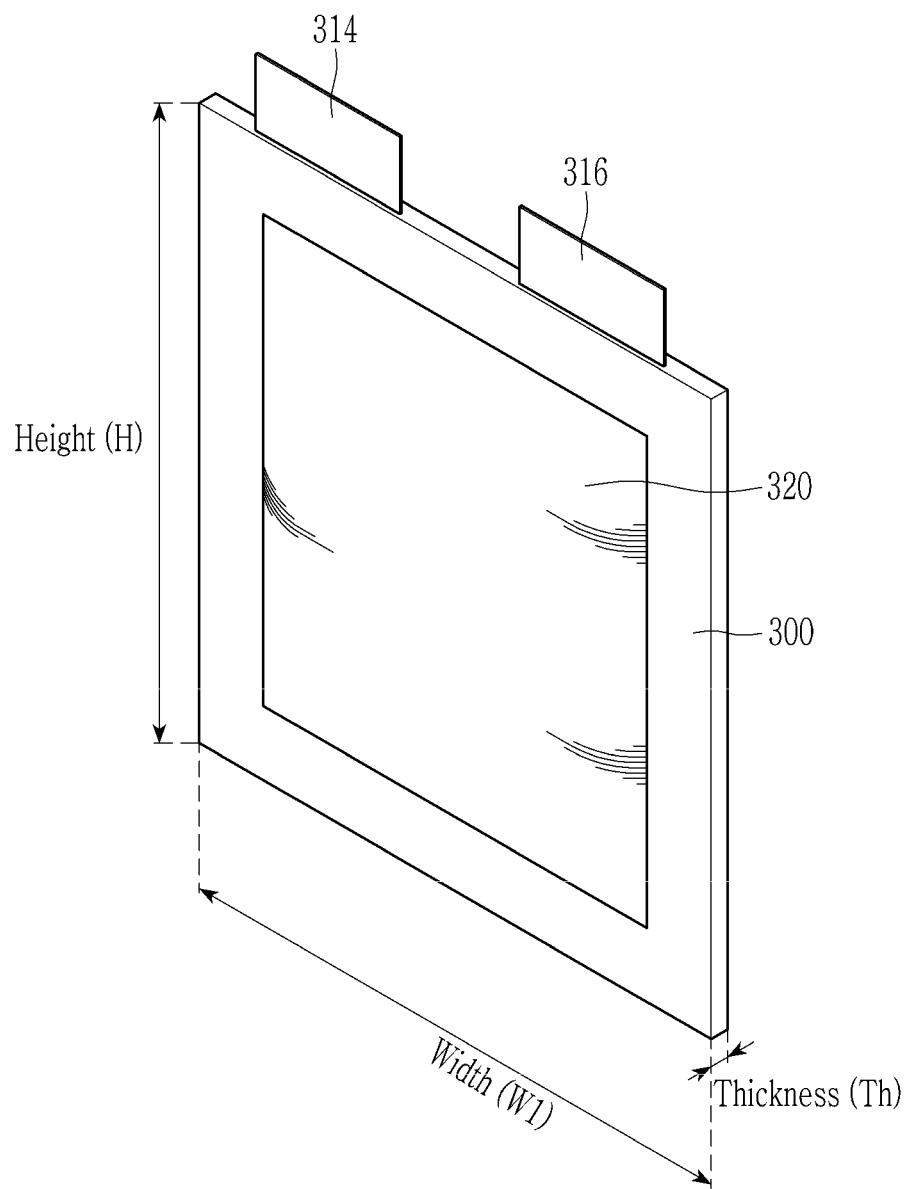
FIG. 7A is a drawing of a pouch-type lithium secondary battery according to another embodiment.
Figure 7B:
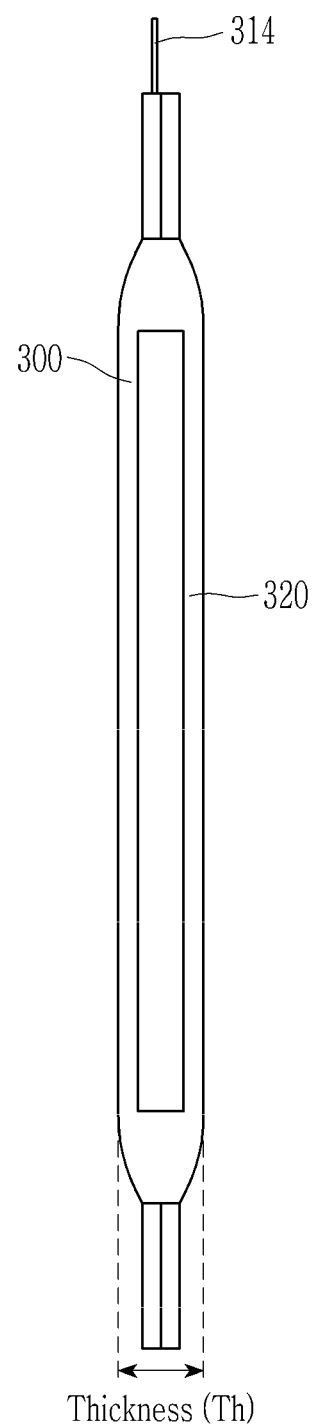
FIG. 7B is a drawing showing a cross sectional view of the pouch-type lithium secondary battery of FIG. 7A.

Furthermore, in a pouch-type case (e.g., a pouch battery), the width (W), the height (H), and the thickness (Th) refer respectively to the width (W), the height (H), and the thickness (Th) shown in FIG. 7A (in which the pouch-type battery is schematically shown) and in FIG. 7B (showing the side of the battery of FIG. 7A). As shown in FIGS. 7A-7B, the pouch-type battery (e.g., the pouch battery) includes a battery case (300), an electrode assembly (320) housed in the battery base (300), a first electrode tab (314), and a second electrode tab (316). The electrode assembly (320) is housed in the battery case (300) and may be at a thicker center portion of the battery case (300), as shown in FIG. 7B.

When the pouch-type battery (e.g., a pouch battery), as shown in FIG. 7B, has the thicker center portion and two thin ends, the thickness (e.g., used as the value of Th) refers to the thickness at the center portion. Furthermore, regardless of the thickness of the center portion or the thickness of the end, the thickness (e.g., used as the value of Th) refers to a thickness of the thickest portion of the battery case (300).

In one embodiment, the battery case may be formed of a metal, sheets (e.g., a laminated sheet) in which a metal layer and a polymer layer are laminated, or steel. The metal may be aluminum, and the polymer may be polyethylene terephthalate, polyethylene, polypropylene, an ethylene propylene copolymer, a copolymer of polypropylene and acrylic acid, or a combination thereof.

Specifically, the battery case may be a pouch (prepared by using a metal or sheets in which a metal layer and a polymer layer are laminated), or a prismatic metal can.

FIG. 1 is a schematic view showing a structure of a lithium secondary battery according to an embodiment of this disclosure. FIG. 1 shows a prismatic lithium secondary battery, and as described above, the battery according to one embodiment may be a prismatic battery as well as a pouch-type battery (e.g., a pouch battery). Thus, the battery according to one embodiment is not limited to the structure shown in FIG. 1.

Referring to FIG. 1, a lithium secondary battery 100 according to an embodiment may include an electrode assembly 40 and a case 50 in which the electrode assembly 40 is contained.

The electrode assembly 40 includes a positive electrode 10 including a positive active material, a negative electrode 20 including a negative active material, and a separator 30 disposed between the positive electrode 10 and the negative electrode 20. The positive electrode 10, the negative electrode 20, and the separator 30 may be impregnated in the aforementioned electrolyte solution (not shown) according to the present disclosure.

The positive electrode 10 includes a current collector and a positive active material layer disposed on the current collector and including a positive active material.

In the positive active material layer, the positive active material may include a compound (lithiated intercalation compound) being capable of intercalating and deintercallating lithium and specifically at least one composite oxide of lithium and a metal of cobalt, manganese, nickel, and a combination thereof may be used. Specific examples thereof may be a compound represented by one of the following chemical formulae. $Li_aA_{1-b}X_bD_2$ ($0.90 \le a \le 1.8$, $0 \le b \le 0.5$); $Li_aA_{1-b}X_bO_{2-c}D_c$ ($0.90 \le a \le 1.8$, $0 \le b \le 0.5$, $0 \le c \le 0.05$); $Li_aE_{1-b}X_bO_{2-c}D_c$ ($0.90 \le a \le 1.8$, $0 \le b \le 0.5$, $0 \le c \le 0.05$); $Li_aE_{2-b}X_bO_{4-c}D_c$ ($0.90 \le a \le 1.8$, $0 \le b \le 0.5$, $0 \le c \le 0.05$); $Li_aNi_{1-b-c}Co_bX_cD_\alpha$ ($0.90 \le a \le 1.8$, $0 \le b \le 0.5$, $0 \le c \le 0.5$, $0 \le \alpha \le 2$); $Li_aNi_{1-b-c}Co_bX_cO_{2-\alpha}T_\alpha$ ($0.90 \le a$ $1.8$, $0 \le b \le 0.5$, $0 \le c \le 0.05$, $0 \le \alpha \le 2$); $Li_aNi_{1-b-c}Co_bX_cO_{2-\alpha}T_\alpha$ ($0.90 \le a \le 1.8$, $0 \le b \le 0.5$, $0 \le c \le 0.05$, $0 \le \alpha \le 2$); $Li_aNi_{1-b-c}Mn_bX_cD_\alpha$ ($0.90 \le a \le 1.8$, $0 \le b \le 0.5$, $0 \le c \le 0.05$, $0 \le \alpha \le 2$); $Li_aNi_{1-b-c}Mn_bX_cO_{2-\alpha}T_\alpha$ ($0.90 \le a \le 1.8$, $0 \le b \le 0.5$, $0 \le c \le 0.05$, $0 \le \alpha \le 2$); $Li_aNi_{1-b-c}Mn_bX_cO_{2-\alpha}T_2$ ($0.90 \le a \le 1.8$, $0 \le b \le 0.5$, $0 \le c \le 0.05$, $0 \le \alpha \le 2$); $Li_aNi_bE_cG_dO_2$ ($0.90 \le a \le 1.8$, $0 \le b \le 0.9$, $0 \le c \le 0.5$, $0.001 \le d \le 0.1$); $Li_aNi_bCo_cMn_dG_eO_2$ ($0.90 \le a \le 1.8$, $0 \le b \le 0.9$, $0 \le c \le 0.5$, $0 \le d \le 0.5$, $0.001 \le e \le 0.1$); $Li_aNiG_bO_2$ ($0.90 \le a \le 1.8$, $0.001 \le b \le 0.1$); $Li_aCoG_bO_2$ ($0.90 \le a \le 1.8$, $0.001 \le b \le 0.1$); $Li_aMn_{1-b}G_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $Li_aMn_{1-g}G_gPO_4$ ($0.90 \le a \le 1.8$, $0 \le g \le 0.5$); $qO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $Li_aFePO_4$ ($0.90 \le a \le 1.8$).

In the chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The lithium metal oxide may have a coating layer on the surface, or may be mixed with another lithium metal oxide having a coating layer. The coating layer may include at least one coating element compound selected from an oxide of a coating element, a hydroxide of a coating element, an oxyhydroxide of a coating element, an oxycarbonate of a coating element, and a hydroxy carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed by a method having no adverse influence on properties of a positive active material by using these elements in the compound, (e.g., the method may include any coating method (e.g., spray coating, dipping, etc.)), but is not illustrated in more detail since it is well-known to those skilled in the related field.

In the positive electrode, the positive active material may be included in an amount of 90 wt % to 98 wt % based on a total weight of the positive active material layer.

In an embodiment, the positive active material layer may include a binder and a conductive material. Herein, the binder and the conductive material may be included in an amount of 1 wt % to 5 wt %, respectively based on the total amount of the positive active material layer.

The binder serves to adhere the positive active material particles with one another and to adhere the positive active material to a current collector and examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to provide conductivity to the electrode and any electrically conductive material may be used as a conductive material unless it causes a chemical change. Examples of the conductive material may include a carbon-based material such as natural graphite, artificial graphite, carbon black, acetylene black, ketjen black, carbon fiber, and the like; a metal-based material of a metal powder or a metal fiber including copper, nickel, aluminum, silver, and the like; a conductive polymer such as a polyphenylene derivative; or a mixture thereof.

The current collector may be an aluminum foil, a nickel foil, or a combination thereof, but is not limited thereto.

The negative electrode 20 includes a current collector and a negative active material layer disposed on the current collector and including a negative active material.

The negative active material may include a material that reversibly intercalates/deintercalates lithium ions, a lithium metal, a lithium metal alloy, a material capable of doping/dedoping lithium, or a transition metal oxide.

The material that reversibly intercalates/deintercalates lithium ions may include for example, a carbon material, and i.e., the carbon material which may be a generally-used carbon-based negative active material in a lithium secondary battery. Examples of the carbon-based negative active material may include crystalline carbon, amorphous carbon, or mixtures thereof. The crystalline carbon may be unspecified shaped, or sheet, flake, spherical, or fiber shaped natural graphite or artificial graphite. The amorphous carbon may be a soft carbon, a hard carbon, a mesophase pitch carbonization product, fired coke, and/or the like.

The lithium metal alloy includes an alloy of lithium and at least one additional metal selected from Na, K, Rb, Cs, Fr, Be, Mg, Ca, Sr, Si, Sb, Pb, In, Zn, Ba, Ra, Ge, Al, and Sn.

The material being capable of doping/dedoping lithium may be Si, $SiO_x$ ($0 < x < 2$), a Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, and not Si), a Si-carbon composite, Sn, $SnO_2$, Sn—R (wherein R is an element selected from an alkali metal, an alkaline-earth metal, a Group 13 element, a Group 14 element, a Group 15 element, a Group 16 element, a transition metal, a rare earth element, and a combination thereof, and not Sn), a Sn-carbon composite, and the like. At least one of these materials may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and a combination thereof.

The transition metal oxide may include lithium titanium oxide.

The negative active material layer includes a negative active material and a binder, and optionally a conductive material.

In the negative active material layer, the negative active material may be included in an amount of 95 wt % to 99 wt % based on the total weight of the negative active material layer. In the negative active material layer, a content of the binder may be 1 wt % to 5 wt % based on a total weight of the negative active material layer. When the negative active material layer includes a conductive material, the negative active material layer includes 90 wt % to 98 wt % of the negative active material, 1 wt % to 5 wt % of the binder, and 1 wt % to 5 wt % of the conductive material.

The binder improves binding properties of negative active material particles with one another and with a current collector. The binder may use a non-water-soluble binder, a water-soluble binder, or a combination thereof.

The non-water-soluble binder may be polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may be a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth)acrylic acid alkyl ester, or a combination thereof.

When the water-soluble binder is used as a negative electrode binder, a cellulose-based compound may be further used to provide viscosity as a thickener. The cellulose-based compound includes one or more of carboxymethyl cellulose, hydroxypropylmethyl cellulose, methyl cellulose, or alkali metal salts thereof. The alkali metals may be Na, K, or Li. The thickener may be included in an amount of 0.1 parts by weight to 3 parts by weight based on 100 parts by weight of the negative active material.

The conductive material is included to provide electrode conductivity, and any electrically conductive material may be used as a conductive material unless it causes a chemical change. Examples of the conductive material include a carbon-based material such as natural graphite, artificial graphite, carbon black, acetylene black, ketjen black, denka black, a carbon fiber, and the like; a metal-based material of a metal powder or a metal fiber including copper, nickel, aluminum silver, and the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof.

The positive active material layer and the negative active material layer are formed by mixing an active material, a binder and optionally a conductive material in a solvent to prepare an active material composition, and coating the active material composition on a current collector. The formation method of the active material layer is well known, and thus is not described in detail in the present disclosure. The solvent includes N-methylpyrrolidone and the like, but is not limited thereto. When a water-soluble binder is used in the negative active material layer, a solvent used for preparing the negative active material composition may be water.

The separator 30 may include polyethylene, polypropylene, polyvinylidene fluoride, and multi-layers thereof such as a polyethylene/polypropylene double-layered separator, a polyethylene/polypropylene/polyethylene triple-layered separator, or a polypropylene/polyethylene/polypropylene triple-layered separator.

Hereinafter, the disclosure (e.g., the subject matters of the disclosure) will be specifically examined (e.g., illustrated) through Examples.

Example 1

(1) Positive Electrode and Negative Electrode 97.3 wt % of $LiCoO_2$ as a positive active material, 1.4 wt % of polyvinylidene fluoride as a binder, and 1.3 wt % of ketjen black as a conductive material were mixed and then, dispersed in N-methylpyrrolidone to prepare positive active material slurry. The positive active material slurry was coated on an aluminum foil and then, dried and compressed to manufacture a positive electrode.

98 wt % of graphite as a negative active material, 1 wt % of polyvinylidene fluoride as a binder, and 1 wt % of ketjen black as a conductive material were mixed and then, dispersed in N-methylpyrrolidone to prepare a negative active material layer composition, and the negative active material layer composition was coated on a copper foil and dried to manufacture a negative electrode.

(2) Preparation of Electrolyte 0.95 M $LiPF_6$ was added to a mixed solution of ethylene carbonate (EC):diethyl carbonate (DEC):ethylpropionate (EP) mixed in a volume ratio of 30:50:20 to prepare a non-aqueous mixed solution.

1.0 wt % of a compound represented by Chemical Formula 1-1 based on an amount of the non-aqueous mixed solution was added thereto to manufacture an electrolyte for a lithium secondary battery.

[Chemical Formula 1-1]

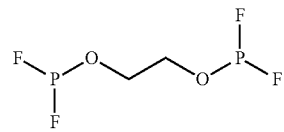

(3) Manufacture of Lithium Secondary Battery Cell

The positive and negative electrodes manufactured according to the (1) and the electrolyte prepared according to the (2) were used to manufacture a half-cell.

Example 2

(1) Manufacture of Positive Electrode and Negative Electrode

A positive electrode and a negative electrode were manufactured in the same method as Example 1.

(2) Manufacture of Electrolyte 0.95 M $LiPF_6$ was added to a first mixed solution of ethylene carbonate (EC):ethylmethyl carbonate (EMC):ethylpropionate (EP):γ-butyrolactone (GBL) used in a volume ratio of 27:50:20:3 to prepare a second mixed solution.

6 wt % of fluoroethylene carbonate (FEC), 0.5 wt % of vinylethylene carbonate (VEC), 0.2 wt % of lithium tetrafluoroborate ($LiBF_4$), 5 wt % of succinonitrile (SN), 2 wt % of hexane tri-cyanide (HTCN), and 0.5 wt % of a compound represented by Chemical Formula 1-1 based on an amount of the second mixed solution were added thereto to prepare an electrolyte for a lithium secondary battery.

[Chemical Formula 1-1]

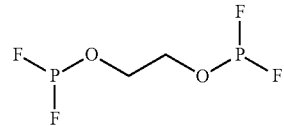

(3) Manufacture of Lithium Secondary Battery Cell

A prismatic lithium secondary battery was manufactured by housing the positive and negative electrodes and a polypropylene separator in a container (or case) and injecting the prepared electrolyte thereinto.

Example 3

A lithium secondary battery cell was manufactured according to the same method as Example 2 except that 0.25 wt % of the compound represented by Chemical Formula 1-1 was added to prepare an electrolyte.

Example 4

A lithium secondary battery cell was manufactured according to the same method as Example 2 except that 1 wt % of the compound represented by Chemical Formula 1-1 was added to prepare an electrolyte.

Example 5

A lithium secondary battery cell was manufactured according to the same method as Example 2 except that 2 wt % of the compound represented by Chemical Formula 1-1 was added to prepare an electrolyte.

Comparative Example 1

(1) Manufacture of Positive Electrode and Negative Electrode

A positive electrode and a negative electrode were manufactured according to the same method as Example 1.

(2) Manufacture of Electrolyte 0.95 M $LiPF_6$ was added to a mixed solution of ethylene carbonate (EC):diethyl carbonate (DEC):ethylpropionate (EP) used in a volume ratio of 30:50:20 to prepare a non-aqueous mixed solution.

(3) Manufacture of Lithium Secondary Battery Cell

A prismatic lithium secondary battery cell was manufactured by housing the positive and negative electrodes manufactured in the above (1) and the electrolyte prepared in the above (2).

Comparative Example 2

(1) Manufacture of Positive Electrode and Negative Electrode

A positive electrode and a negative electrode were manufactured according to the same method as Example 1.

(2) Manufacture of Electrolyte

An electrolyte for a lithium secondary battery cell was manufactured according to the same method as Example 2 except that the compound represented by Chemical Formula 1-1 was not added thereto.

(3) Manufacture of Lithium Secondary Battery Cell

A lithium secondary battery cell was manufactured according to the same method as Example 2.

Experimental Example 1—CV Characteristics Evaluation

Cyclic voltammetry (CV) characteristics of the half-cells according to Example 1 and Comparative Example 1 were evaluated. The result of Example 1 is shown in FIG. 2, and the result of Comparative Example 1 is shown in FIG. 3.

In FIGS. 2 and 3, 1, 3, and 5 denote the number of cycles.

Figure 2:
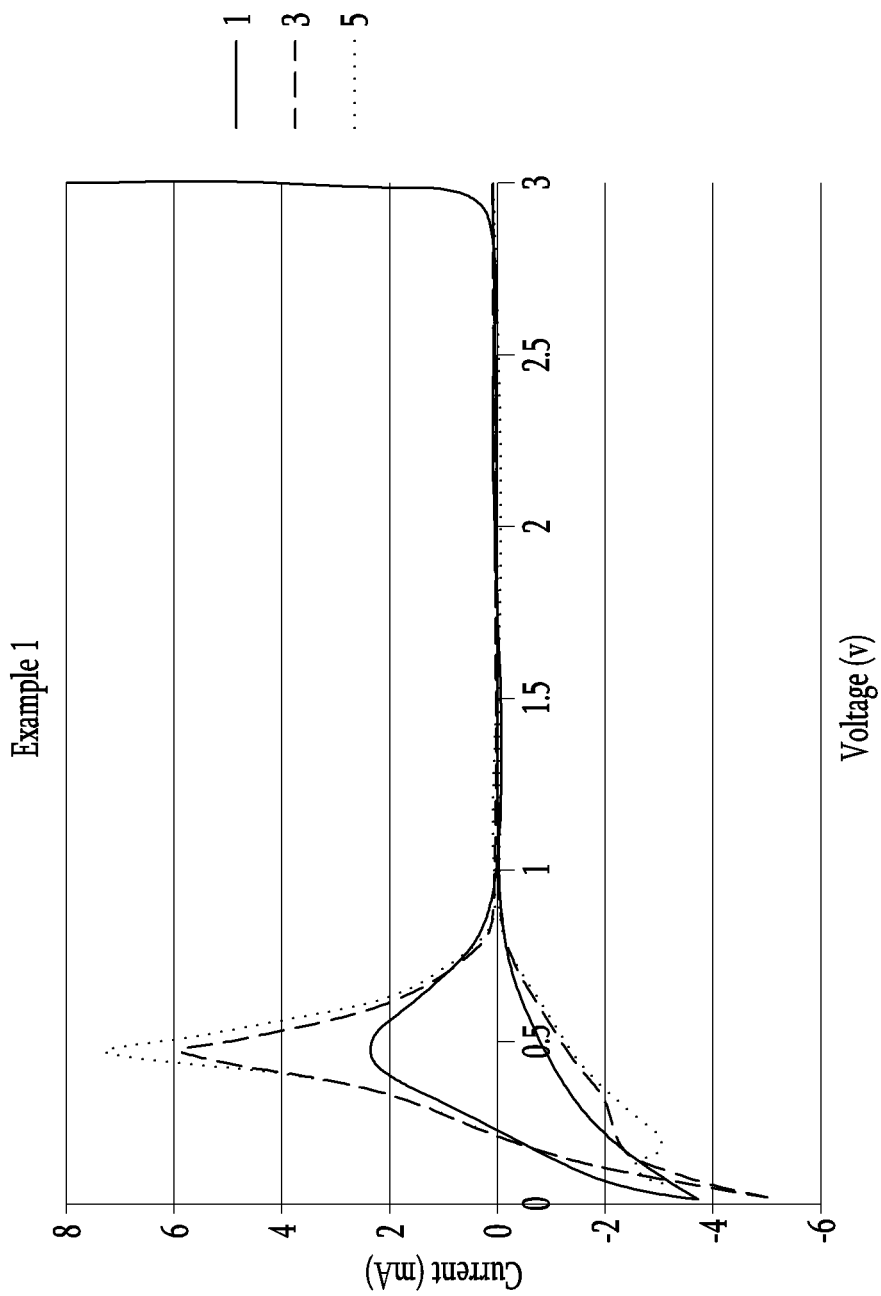
FIG. 2 shows CV characteristic evaluation results of Example 1.
Figure 3:
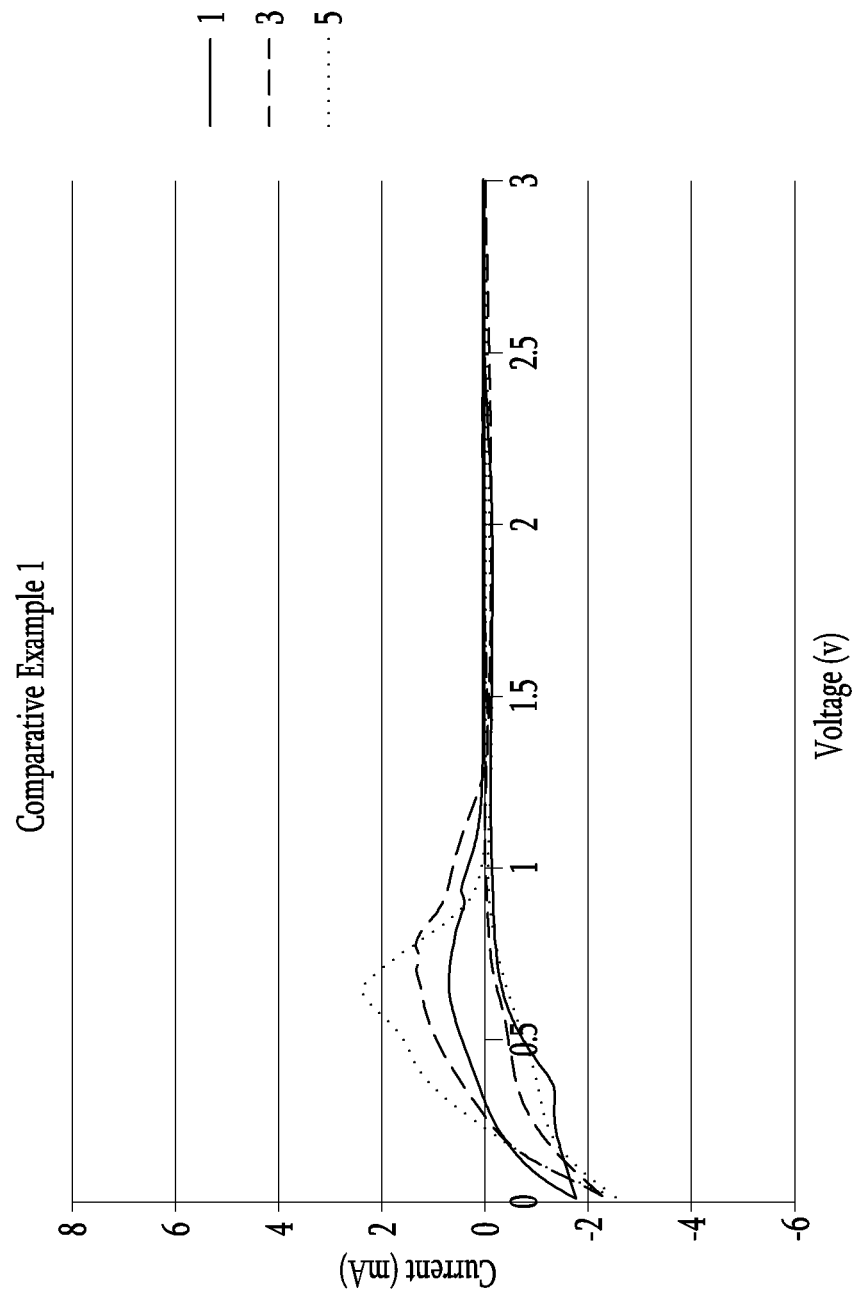
FIG. 3 shows CV characteristic evaluation results of Comparative Example 1.

Referring to FIGS. 2 and 3, currents were largely increased during both of intercalation/deintercalation of lithium in FIG. 2 compared with FIG. 3. Accordingly, when the lithium secondary battery cell including the electrolyte using additives including the compound represented by Chemical Formula 1-1 according to Example 1 was compared with the lithium secondary battery cell according to Comparative Example 1, lithium ions were relatively more easily intercalated/deintercalated.

Experimental Example 2—Evaluation of LSV Characteristics

Figure 4A:
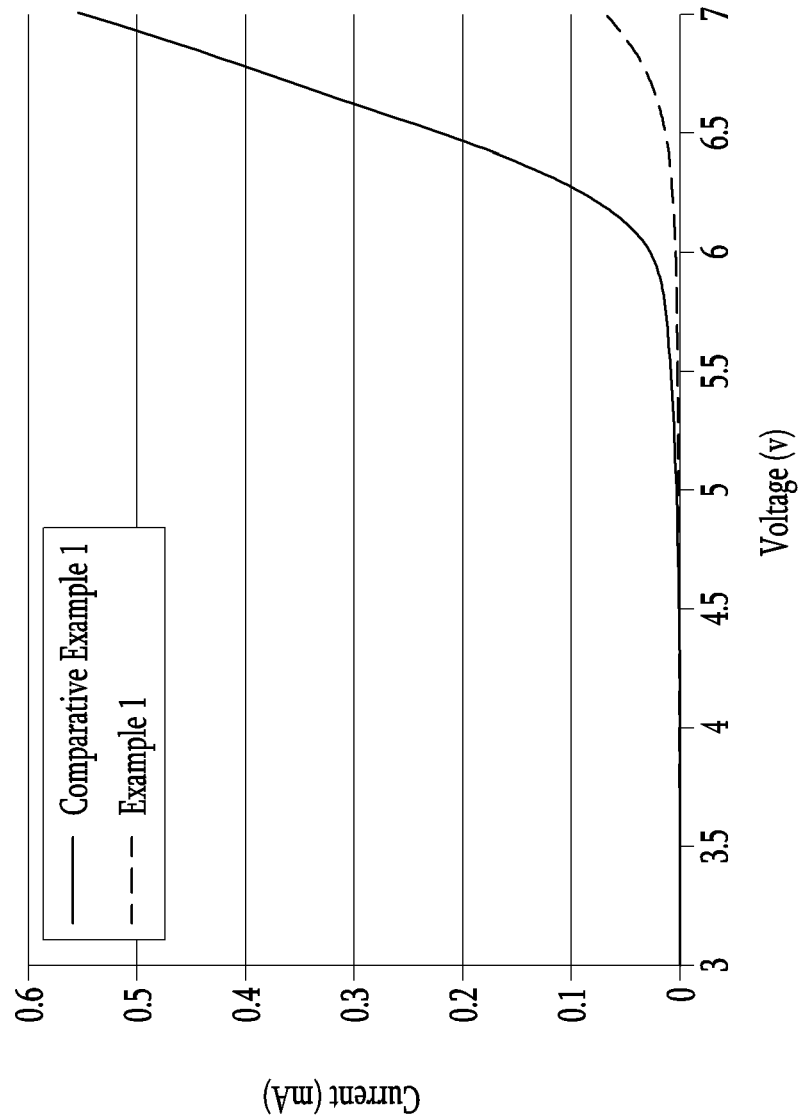
FIG. 4A shows LSV evaluation results of Example 1 and Comparative Example 1.
Figure 4B:
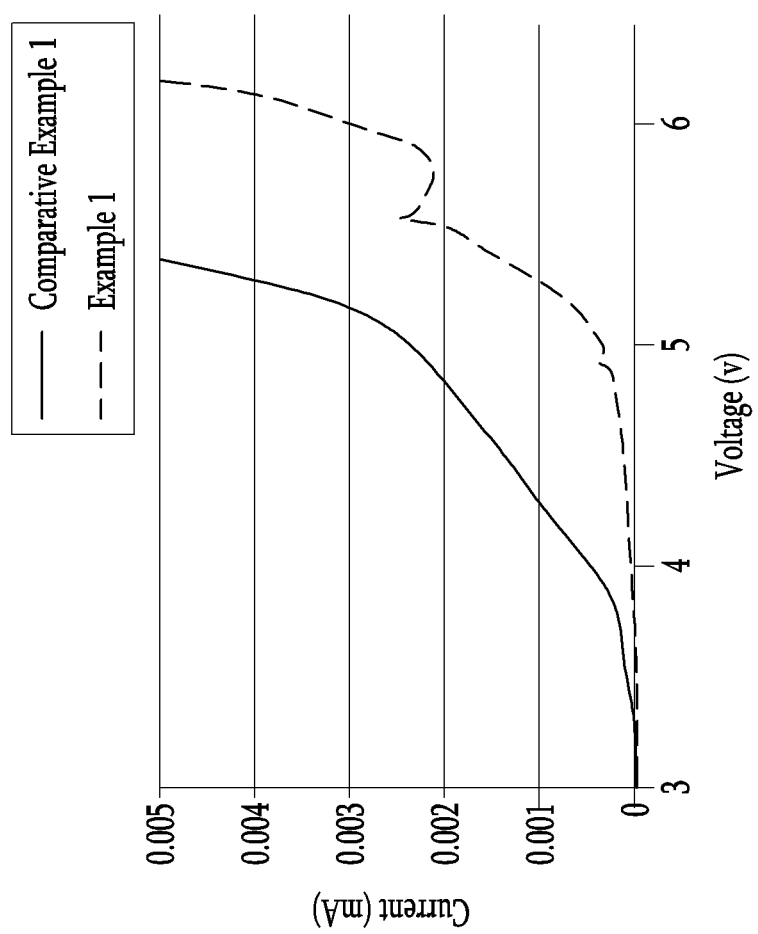
FIG. 4B is an enlarged view showing a y-axis scale of FIG. 4A.

The electrolytes of Example 1 and Comparative Example 1 were evaluated regarding oxidation electrode decomposition at 25° C. using a linear sweep voltammetry (LSV) method. In this evaluation, a three-electrode electrochemical cell using a Pt electrode as a working electrode, a counter electrode, and Li as a reference electrode was used. Herein, a scan was performed in a range of 3.0 V to 7.0 V at a rate of 1 mV/sec, and the results are shown in FIGS. 4A and 4B. FIG. 4A shows LSV evaluation results of Example 1 and Comparative Example 1, and FIG. 4B is an enlarged view showing a y-axis scale of FIG. 4A.

Referring to FIGS. 4A and 4B, the electrolyte including additives including the compound represented by Chemical Formula 1-1 according to Example 1 exhibited an onset potential increase at a higher voltage compared with the electrolyte according to Comparative Example 1. Accordingly, when the additive of Chemical Formula 1-1 was added, oxidation resistance of an electrolyte was increased.

Experimental Example 3—Thickness Increase Rate

The lithium secondary battery cells according to Example 2 and Comparative Example 2 were constant current charged at current density of 1 C until a voltage reached 4.45 V. After measuring thicknesses of the cells after the charge, their thickness variation ratios (%) were measured every seven day, while stored at 60° C. for 28 days. The thickness variation ratios measured at the $28^{th}$ day were shown in Table 1.

TABLE 1

| Division | Thickness increase rate (%) |
|---|---|
| Example 2 | 14.3 |
| Example 3 | 22.9 |
| Example 4 | 9.0 |
| Example 5 | 11 |
| Comparative Example 2 | 23.8 |

Figure 5:
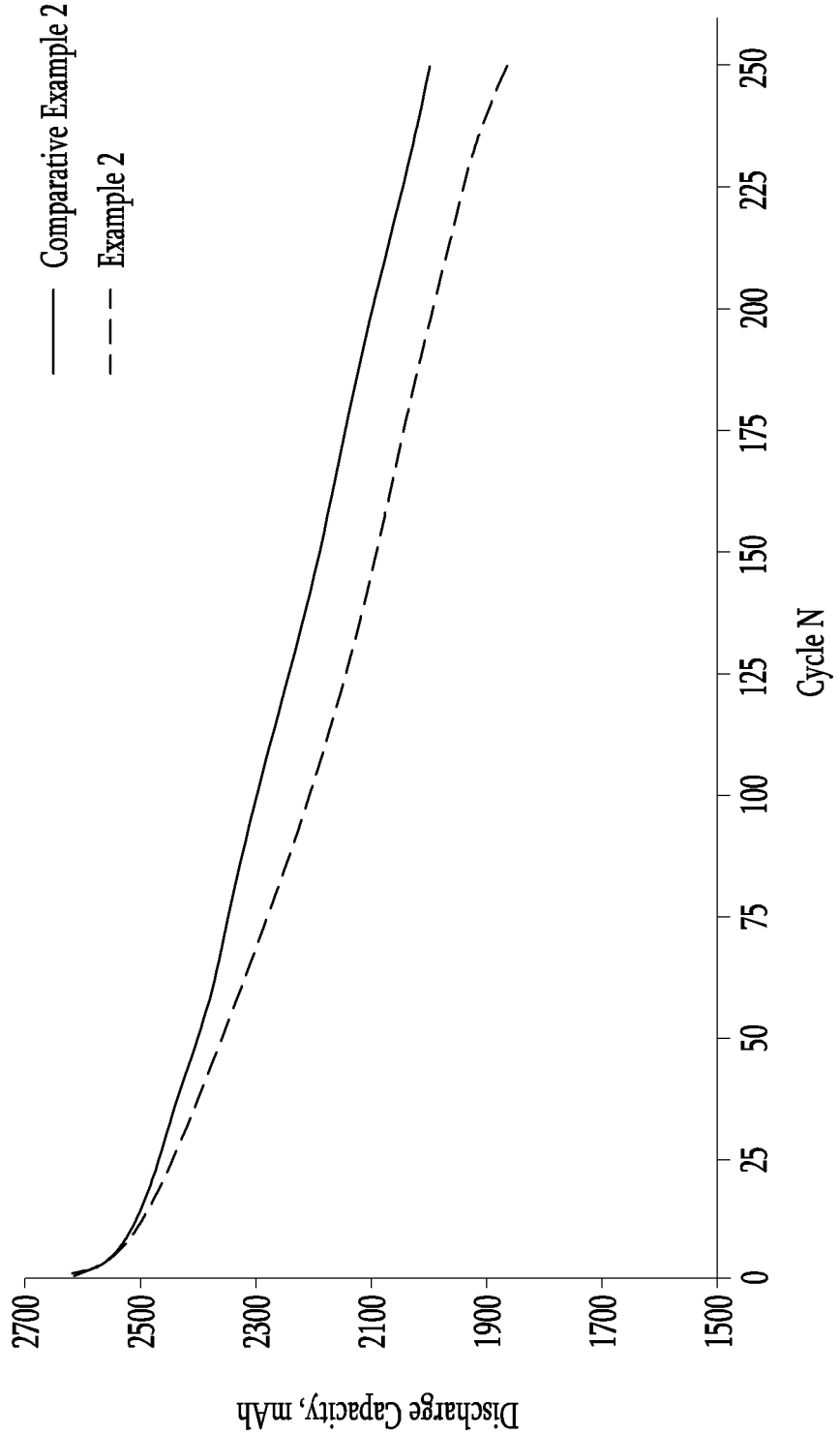
FIG. 5 shows the results of measurement of cycle characteristics for Example 2 and Comparative Example 2.

Referring to Table 1 and FIG. 5, the lithium secondary battery cells using the electrolyte including the additive of the present invention according to example embodiments exhibited a significantly reduced thickness compared with the lithium secondary battery cells not including the additive according to Comparative Example.

Experimental Example 4—Cycle Characteristics

The lithium secondary battery cells according to Example 2 and Comparative Example 2 were constant current charged at current density of 1 C at 45° C. until a voltage reached 4.45 V. Subsequently, the lithium secondary battery cells were allowed to stand for 10 minutes and then, discharged at constant current of 1 C, until the voltage reached 3 V, and this charge and discharge as one cycle was 250 times repeated. The results are shown in FIG. 5.

Referring to FIG. 5, the lithium secondary battery cells according to Examples exhibited excellent high temperature cycle-life characteristics compared with the lithium secondary battery cell according to Comparative Example.

Example 6

(1) Positive Electrode and Negative Electrode 97.3 wt % of LiCoO$_2$ as a positive active material, 1.4 wt % of polyvinylidene fluoride as a binder, and 1.3 wt % of ketjen black as a conductive material were mixed, and then dispersed in N-methylpyrrolidone to prepare a positive active material slurry. The positive active material slurry was coated on an aluminum foil, and then dried and compressed to manufacture a positive electrode.

98 wt % of a mixture of graphite and Si (96:4 weight ratio) as a negative active material, 1 wt % of polyvinylidene fluoride as a binder, and 1 wt % of ketjen black as a conductive material were mixed and then dispersed in N-methylpyrrolidone to prepare a negative active material slurry. The negative active material slurry was coated on a copper foil, and then dried and compressed to manufacture a negative electrode.

(2) Preparation of Electrolyte 1.5 M LiPF$_6$ was added to a mixed solution of ethylene carbonate (EC):ethyl propionate (EP):propyl propionate (PP) mixed in a volume ratio of 30:50:20 to prepare a non-aqueous mixed solution.

6 wt % of fluoroethylene carbonate (FEC), 0.5 wt % of vinyl ethylene carbonate (VEC), 0.2 wt % of lithium tetrafluoroborate (LiBF$_4$), 0.25 wt % of succinonitrile (SN), 2 wt % of hexane tri-cyanide (HTCN), and 0.5 wt % of a compound represented by Chemical Formula 1-1 based on 100 wt % of the non-aqueous mixed solution were added thereto to manufacture an electrolyte for a lithium secondary battery.

[Chemical Formula 1-1]

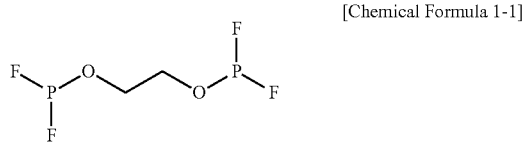

(3) Manufacture of Lithium Secondary Battery Cell

An electrode assembly including the positive and negative electrodes manufactured according to (1) and a polypropylene separator was inserted into an aluminum pouch-type battery case (e.g., pouch battery case) having a width (W) of 20 mm, a height (H) of 30 mm, and a thickness (Th) of 0.3 mm, and the electrolyte prepared according to (2) was injected thereto to manufacture a lithium secondary battery cell with a capacity of 80 mAh.

Example 7

A lithium secondary battery cell was manufactured according to the same method as Example 6, except that an aluminum pouch-type battery case (e.g., pouch battery case) having a width (W) of 26.6 mm, a height (H) of 40 mm, and a thickness (Th) of 8.8 mm was used to manufacture a lithium secondary battery with a capacity of 2450 mAh.

Comparative Example 3

(1) Manufacture of Positive Electrode and Negative Electrode

A positive electrode and a negative electrode were manufactured according to the same method as Example 6.

(2) Preparation of Electrolyte 1.5 M LiPF$_6$ was added to a mixed solution of ethylene carbonate (EC):ethyl propionate (EP):propyl propionate (PP) mixed in a volume ratio of 30:50:20 to prepare a non-aqueous mixed solution.

6 wt % of fluoroethylene carbonate (FEC), 0.5 wt % of vinyl ethylene carbonate (VEC), 0.2 wt % of lithium tetrafluoroborate (LiBF$_4$), 0.25 wt % of succinonitrile (SN), and 2 wt % of hexane tri-cyanide (HTCN) based on 100 wt % of the non-aqueous mixed solution were added thereto to manufacture an electrolyte for a lithium secondary battery.

(3) Manufacture of Lithium Secondary Battery Cell

An electrode assembly including the positive and negative electrodes manufactured according to (1) and a polypropylene separator was inserted into an aluminum pouch-type battery case (e.g., pouch battery case) having a width (W) of 20 mm, a height (H) of 30 mm, and a thickness (Th) of 0.3 mm, and the electrolyte prepared according to (2) was injected thereto to manufacture a lithium secondary battery cell with a capacity of 80 mAh.

Comparative Example 4

A lithium secondary battery cell was manufactured according to the same method as Comparative Example 3, except that an aluminum pouch-type battery case (e.g., pouch battery case) having a width (W) of 26.6 mm, a height (H) of 40 mm, and a thickness (Th) of 8.8 mm was used to manufacture a lithium secondary battery with a capacity of 2450 mAh.

Comparative Example 5

A lithium secondary battery cell was manufactured according to the same method as Comparative Example 3, except that an aluminum pouch-type battery case (e.g., a pouch battery case) having a width (W) of 8 mm, a height (H) of 12 mm, and a thickness (Th) of 5 mm was used to manufacture a lithium secondary battery with a capacity of 150 mAh.

Comparative Example 6

A lithium secondary battery cell was manufactured according to the same method as Comparative Example 5, except that 1.5 M LiPF$_6$ was added to a mixed solution of ethylene carbonate (EC):ethyl propionate (EP):propyl propionate (PP) mixed in a volume ratio of 30:50:20 to prepare a non-aqueous mixed solution, and 6 wt % of fluoroethylene carbonate (FEC), 0.5 wt % of vinyl ethylene carbonate (VEC), 0.2 wt % of lithium tetrafluoroborate (LiBF$_4$), 0.25 wt % of succinonitrile (SN), 2 wt % of hexane tri-cyanide (HTCN), and 0.5 wt % of a compound represented by Chemical Formula 1-1 based on 100 wt % of the non-aqueous mixed solution were added thereto to prepare an electrolyte, and the electrolyte was used to manufacture a lithium secondary battery with a capacity of 150 mAh.

Experimental Example 5—Thickness Increase Rate

The lithium secondary battery cells according to Example 6 and Comparative Examples 3, 5, and 6 were each constant-current charged at a current density of 1 C until a voltage reached 4.35 V. After measuring thicknesses of each of the cells after the charge, the cells were stored at 60° C. for 14 days, and then the thicknesses after storing the cells were measured. Their thickness increase rates (%) were each measured by dividing the difference in thickness after and before storing to the thickness before storing. The results are shown in Table 2.

The lithium secondary battery cells according to Example 7 and Comparative Example 4 were each constant-current charged at a current density of 1 C until a voltage reached 4.35 V. After measuring thicknesses of each of the cells after the charge, the cells were stored at 75° C. for 48 hours and then the thicknesses after storing the cells were measured. Their thickness increase rates (%) were each measured by dividing the difference in thickness after and before storing to the thickness before storing. The results are shown in Table 2.

TABLE 2

|  | Capacity (mAh) | W * H * Th(mm) | Thickness/ length | Amount of compound of Chemical 1-1 (wt %) | Thickness increase rate (%) |
| --- | --- | --- | --- | --- | --- |
| Comparative Example 5 | 150 | 8 * 12 * 5 | 0.42 | 0 | 2 |
| Comparative Example 6 | 150 | 8 * 12 * 5 | 0.42 | 0.5 | 2 |
| Comparative Example 3 | 80 | 20 * 30 * 0.3 | 0.01 | 0 | 4.1 |
| Example 6 | 80 | 20 * 30 * 0.3 | 0.01 | 0.5 | 2.3 |
| Comparative Example 4 | 2450 | 26.6 * 40 * 8.8 | 0.22 | 0 | 15.8 |
| Example 7 | 2450 | 26.6 * 40 * 8.8 | 0.22 | 0.5 | 9.6 |

As shown in Table 2, the battery cell according to Example 6 (using the battery case with the thickness/height of 0.01 to 0.4 and the electrolyte with the additive of Chemical Formula 1-1) exhibited a thickness increase rate which was reduced by 1.8% (from 4.1% to 2.3%), compared to the battery cell according to Comparative Example 3 (including the electrolyte without the additive of Chemical Formula 1-1).

Furthermore, the battery cell according to Example 7 (using the battery case with the thickness/height of 0.01 to 0.4 and the electrolyte with the additive of Chemical Formula 1-1) exhibited a thickness increase rate which was reduced by 6.2% (from 15.8% to 9.6%), compared to the battery cell according to Comparative Example 4 (including the electrolyte without the additive of Chemical Formula 1-1).

Whereas, in the battery cells according to Comparative Examples 5 and 6 (each using the battery case with the thickness/height of 0.42), although the battery cells (e.g., Comparative Example 6) each used the electrolyte with the additive of Chemical Formula 1-1, no changes in the thickness increase rate were exhibited.

Example 8

(1) Positive Electrode and Negative Electrode 97.3 wt % of $LiNi_{0.8}Co_{0.1}Mn_{0.1}O_2$ as a positive active material, 1.4 wt % of polyvinylidene fluoride as a binder, and 1.3 wt % of ketjen black as a conductive material were mixed and then dispersed in N-methylpyrrolidone to prepare a positive active material slurry. The positive active material slurry was coated on an aluminum foil, and then dried and compressed to manufacture a positive electrode.

98 wt % of a mixture of graphite as a negative active material, 1 wt % of polyvinylidene fluoride as a binder, and 1 wt % of ketjen black as a conductive material were mixed and then dispersed in N-methylpyrrolidone to prepare a negative active material slurry. The negative active material slurry was coated on a copper foil, and then dried and compressed to manufacture a negative electrode.

(2) Preparation of Electrolyte 1.15 M $LiPF_6$ was added to a mixed solution of ethylene carbonate (EC):ethyl methyl carbonate (EMC):dimethyl carbonate (DMC) mixed in a volume ratio of 20:40:40 to prepare a non-aqueous mixed solution.

1 wt % of vinylene carbonate and 0.5 wt % of a compound represented by Chemical Formula 1-1 based on 100 wt % of the non-aqueous mixed solution were added thereto to manufacture an electrolyte for a lithium secondary battery.

[Chemical Formula 1-1]

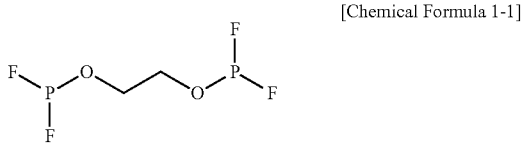

(3) Manufacture of Lithium Secondary Battery Cell

An electrode assembly including the positive and negative electrodes manufactured according to (1) and a polypropylene separator was inserted into an aluminum can prismatic battery case having a width (W) of 148 mm, a height (H) of 91 mm, and a thickness (Th) of 26.5 mm, and the electrolyte prepared according to (2) was injected thereto to manufacture a lithium secondary battery cell.

Example 9

A lithium secondary battery cell was manufactured according to the same method as Example 8, except that an aluminum can prismatic battery case having a width (W) of 178 mm, a height (H) of 120 mm, and a thickness (Th) of 45 mm was used to manufacture a lithium secondary battery.

Comparative Example 7

(1) Manufacture of Positive Electrode and Negative Electrode

A positive electrode and a negative electrode were manufactured according to the same method as Example 8.

(2) Preparation of Electrolyte 1.15 M $LiPF_6$ was added to a mixed solution of ethylene carbonate (EC):ethyl methyl carbonate (EMC):dimethyl carbonate (DMC) mixed in a volume ratio of 20:40:40 to prepare a non-aqueous mixed solution.

1 wt % of vinylene carbonate based on 100 wt % of the non-aqueous mixed solution were added thereto to manufacture an electrolyte for a lithium secondary battery.

(3) Manufacture of Lithium Secondary Battery Cell

An electrode assembly including the positive and negative electrodes manufactured according to (1) and a polypropylene separator was inserted into an aluminum can prismatic battery case having a width (W) of 148 mm, a height (H) of 91 mm, and a thickness (Th) of 26.5 mm, and the electrolyte prepared according to (2) was injected thereto to manufacture a lithium secondary battery cell.

Comparative Example 8

A lithium secondary battery cell was manufactured according to the same method as Comparative Example 7, except that an aluminum can prismatic battery case having a width (W) of 178 mm, a height (H) of 120 mm, and a thickness (Th) of 45 mm was used to manufacture a lithium secondary battery.

Comparative Example 9

A lithium secondary battery cell was manufactured according to the same method as Comparative Example 7, except that an aluminum can prismatic battery case having a width (W) of 120 mm, a height (H) of 78 mm, and a thickness (Th) of 12 mm was used to manufacture a lithium secondary battery.

Comparative Example 10

A lithium secondary battery cell was manufactured according to the same method as Comparative Example 9, except that 1.15 M $LiPF_6$ was added to a mixed solution of ethylene carbonate (EC):ethyl methyl carbonate (EMC):dimethyl carbonate (DMC) mixed in a volume ratio of 20:40:40 to prepare a non-aqueous mixed solution, and 1 wt % of vinylene carbonate and 0.5 wt % of a compound represented by Chemical Formula 1-1 based on 100 wt % of the non-aqueous mixed solution were added thereto to prepare an electrolyte that was then used to manufacture a lithium secondary battery.

Comparative Example 11

A lithium secondary battery cell was manufactured according to the same method as Comparative Example 7, except that an aluminum can prismatic battery case having a width (W) of 148 mm, a height (H) of 71 mm, and a thickness (Th) of 96 mm was used to manufacture a lithium secondary battery.

Comparative Example 12

A lithium secondary battery cell was manufactured according to the same method as Comparative Example 11, except that 1.15 M $LiPF_6$ was added to a mixed solution of ethylene carbonate (EC):ethyl methyl carbonate (EMC):dimethyl carbonate (DMC) mixed in a volume ratio of 20:40:40 to prepare a non-aqueous mixed solution, and 1 wt % of vinylene carbonate and 0.5 wt % of a compound represented by Chemical Formula 1-1 based on 100 wt % of the non-aqueous mixed solution were added thereto to prepare an electrolyte that was then used to manufacture a lithium secondary battery.

Experimental Example 6—Thickness Increase Rate

The lithium secondary battery cells according to Examples 8 to 9 and Comparative Examples 7 to 12 were each constant-current charged at a current density of 1 C until a voltage reached 4.25 V. After measuring thicknesses of each of the cells after the charge, the cells were stored at 60° C. for 6 days, and then the thicknesses after storing the cells were measured. Their thickness increase rates (%) were each measured by dividing the difference in thickness after and before storing to the thickness before storing. The results are shown in Table 3.

TABLE 3

| | W * H * Th(mm) | Thickness/ Width | Amount of compound of Chemical 1-1 (wt %) | Thickness increase rate (%) |
|---|---|---|---|---|
| Comparative Example 7 | 148 * 91 * 26.5 | 0.17 | 0 | 32 |
| Example 8 | 148 * 91 * 26.5 | 0.17 | 0.5 | 28 |
| Comparative Example 8 | 178 * 120 * 45 | 0.25 | 0 | 27 |
| Example 9 | 178 * 120 * 45 | 0.25 | 0.5 | 16 |
| Comparative Example 9 | 120 * 78 * 12 | 0.1 | 0 | 4 |
| Comparative Example 10 | 120 * 78 * 12 | 0.1 | 0.5 | 4 |
| Comparative Example 11 | 148 * 71 * 96 | 0.64 | 0 | 45 |
| Comparative Example 12 | 148 * 71 * 96 | 0.65 | 0.5 | 31 |

As shown in Table 3, the battery cell according to Example 8 (using the battery case with the thickness/width of more than 0.1 and less than or equal to 0.6 and the electrolyte with the additive of Chemical Formula 1-1) exhibited a thickness increase rate which was reduced by 4% (from 32% to 28%), compared to the battery cell according to Comparative Example 7 (including the electrolyte without the additive of Chemical Formula 1-1), and the battery cell according to Example 9 exhibited a thickness increase rate which was reduced by 11% (from 27% to 16%), compared to the battery cell according to Comparative Example 8.

Furthermore, in the battery cells according to Comparative Examples 9 to 12 (using the battery case with the thickness/height of 0.1 or 0.6), although some of the battery cells (e.g., Comparative Examples 10 and 12) used the electrolyte with the additive of Chemical Formula 1-1, no changes in the thickness increase rate were exhibited (e.g., compared with Comparative Examples 9 and 11 respectively).

While this invention has been described in connection with what is presently considered to be practical example embodiments, it is to be understood that the invention is not limited to the disclosed embodiments, and on the contrary, it is intended to cover various modifications and equivalent arrangements included within the spirit and scope of the appended claims, and equivalents thereof.

DESCRIPTION OF SYMBOLS

100: secondary battery
10: positive electrode
20: negative electrode
30: separator
50: case

What is claimed is:
1. A lithium secondary battery, comprising:
an electrolyte comprising a non-aqueous organic solvent, a lithium salt, and an additive comprising a compound represented by Chemical Formula 1; and
a battery case in which the electrolyte is housed,
wherein the battery case has a shape with a width (W), a height (H), and a thickness (Th), and
when a maximum value among the width (W), the height (H), and the thickness (Th) is a and a minimum value among the width (W), the height (H), and the thickness (Th) is b, b/a is 0.01 or more:

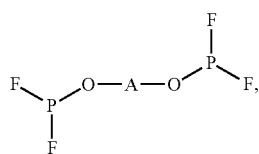

[Chemical Formula 1]

and
wherein, in Chemical Formula 1, A is a substituted or unsubstituted aliphatic chain or (—$C_2H_4$—O—$C_2H_4$-)n, and n is an integer from 1 to 10.

2. The lithium secondary battery of claim 1, wherein the lithium secondary battery is a pouch battery and b/a is 0.01 to 0.4.

3. The lithium secondary battery of claim 1, wherein the lithium secondary battery is a prismatic battery and b/a is more than 0.1.

4. The lithium secondary battery of claim 1, wherein the battery case is composed of a metal, a laminated sheet comprising a metal layer and a polymer layer, and/or steel.

5. The lithium secondary battery of claim 1, wherein in Chemical Formula 1, A is a C2 to C20 hydrocarbon chain or (—$C_2H_4$—O—$C_2H_4$-)n, and n is an integer from 1 to 5.

6. The lithium secondary battery of claim 1, wherein the compound represented by Chemical Formula 1 is a compound represented by Chemical Formula 1-1:

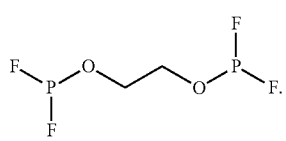

[Chemical Formula 1-1]

7. The lithium secondary battery of claim 1, wherein the additive is 0.1 wt % to 10 wt % in amount based on a total amount of the electrolyte.

8. The lithium secondary battery of claim 7, wherein the additive is 0.1 wt % to 5 wt % in amount based on the total amount of the electrolyte.

9. The lithium secondary battery of claim 1, wherein the electrolyte further comprises an additional additive selected from fluoroethylene carbonate, vinylethylene carbonate, vinylene carbonate, succinonitrile, hexane tricyanide, lithiumtetrafluoroborate, propane sultone, and a combination thereof.

10. The lithium secondary battery of claim 9, wherein the additional additive is 0.1 wt % to 20 wt % in amount based on a total amount of the electrolyte.

11. The lithium secondary battery of claim 1, wherein the lithium salt is selected from $LiPF_6$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, LiCl, LiI, $LiB(C_2O_4)_2$, LiDFOP, LiDFOB, $LiPO_2F_2$, and $LiN(C_xF_{2x+1}SO_2)(CyF_{2y+1}SO_2)$, wherein x and y are each independently an integer from 0 to 20.

12. A method of manufacturing the lithium secondary battery of claim 1, the method comprising:
mixing the non-aqueous organic solvent, the lithium salt, and the additive comprising the compound represented by Chemical Formula 1 to prepare the electrolyte; and
adding the electrolyte to the battery case.

13. A lithium secondary battery additive, comprising:
a compound represented by Chemical Formula 1,
wherein the compound is configured for a battery case having a shape with a width (W), a height (H), and a thickness (Th), and
when a maximum value among the width (W), the height (H), and the thickness (Th) is a and a minimum value among the width (W), the height (H), and the thickness (Th) is b, b/a is 0.01 or more:

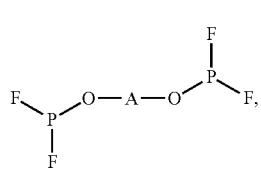

[Chemical Formula 1]

and
wherein, in Chemical Formula 1, A is a substituted or unsubstituted aliphatic chain or (—$C_2H_4$—O—$C_2H_4$-)n, and n is an integer from 1 to 10.

14. A method of manufacturing the lithium secondary battery additive of claim 13, the method comprising:
providing the compound represented by Chemical Formula 1,
wherein the additive is configured for the battery case having the shape with the width (W), the height (H), and the thickness (Th).

* * * * *